US006896293B2

(12) United States Patent
Philipps et al.

(10) Patent No.: US 6,896,293 B2
(45) Date of Patent: May 24, 2005

(54) MOTORCYCLE FUEL TANK MOUNTING ARRANGEMENT

(75) Inventors: Brian J. Philipps, West Bend, WI (US); Scott W. Matthews, Franklin, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 18 days.

(21) Appl. No.: 10/618,452

(22) Filed: Jul. 11, 2003

(65) Prior Publication Data

US 2005/0006162 A1 Jan. 13, 2005

(51) Int. Cl.[7] .................................................. B62J 35/00
(52) U.S. Cl. ........................ 280/833; 280/835; 220/562
(58) Field of Search ................................ 280/833, 835; 220/562

(56) References Cited

U.S. PATENT DOCUMENTS 4,234,050 A * 11/1980 Condon ...................... 180/190
4,449,723 A * 5/1984 Shiratsuchi ................. 280/833
6,478,335 B2 * 11/2002 Reed .......................... 280/835
6,725,519 B2 * 4/2004 Krejci ....................... 29/421.1

FOREIGN PATENT DOCUMENTS

JP 02077383 A * 3/1990 ............ B62J/35/00

OTHER PUBLICATIONS

Harley–Davidson Motor Co., Inc., Parts Catalog XLH Models, 1986, pp. 64–65.
Harley–Davidson, Inc., Parts Catalog, 1340 Models, 1987, pp. 146–153.
Harley–Davidson Motor Co., 1993/94 All Models Parts Catalog, Sportster Five–Speed/Belt Drive, pp. 76–77.
Harley–Davidson Motor Company, 1993 and 1994 Parts Catalog, Models 1340, pp. 200–209.
Harley–Davidson Motor Co., 1993 and 1994 Official Factory Manual, Service Manual, XLH Models, pp. 4–21 through 4–23.

* cited by examiner

*Primary Examiner*—Kevin Hurley
(74) *Attorney, Agent, or Firm*—Michael Best & Friedrich, LLP

(57) ABSTRACT

A motorcycle including a frame having a forward portion, a rearward portion, and a backbone portion positioned between the forward and rearward portions. A fuel tank includes a top wall, side walls that extend generally downwardly from the top wall, and bottom walls that extend from the side walls generally toward one another. A tunnel wall extends between the bottom walls and defines a concave tunnel portion of the fuel tank, which is configured to receive the backbone portion of the frame. A one-piece mounting bracket is coupled to and extends along the tunnel wall. The mounting bracket includes a forward mounting portion coupled to the forward portion of the frame, and a rearward mounting portion coupled to the rearward portion of the frame to secure the fuel tank to the motorcycle.

14 Claims, 7 Drawing Sheets

38
70
102
108
104
54
50
46
6
6
66
90
94
100

104
106
102
70
70
38
58
50
50
54
54
86
66
66
62
90
94
98

MOTORCYCLE FUEL TANK MOUNTING ARRANGEMENT

FIELD OF THE INVENTION

The present invention relates to motorcycles, and more specifically to fuel tank mounting arrangements for motorcycles.

BACKGROUND

Many motorcycle fuel tanks are coupled to the motorcycle frame in a position between the motorcycle handlebars and the motorcycle seat. Although the size and shape of motorcycle fuel tanks vary significantly, many of the fuel tanks are secured to the motorcycle frame in a similar manner. One common way fuel tanks are secured to the motorcycle frame is by welding or otherwise securing multiple individual brackets to various locations on the fuel tank and coupling the individual brackets to the frame. The brackets are generally coupled to the frame using fasteners.

SUMMARY OF THE INVENTION

The present invention provides a motorcycle including a frame and a fuel tank. The fuel tank includes a tunnel wall defining a concave tunnel portion of the fuel tank, which is configured to receive a backbone portion of the frame. The motorcycle further includes a one-piece mounting bracket that is coupled to and extends along the tunnel wall. The mounting bracket includes a forward mounting portion coupled to a forward portion of the frame, and a rearward mounting portion coupled to a rearward portion of the frame to secure the fuel tank to the motorcycle.

Other features of the invention will become apparent to those skilled in the art upon review of the following detailed description, claims, and drawings.

Figure 1:
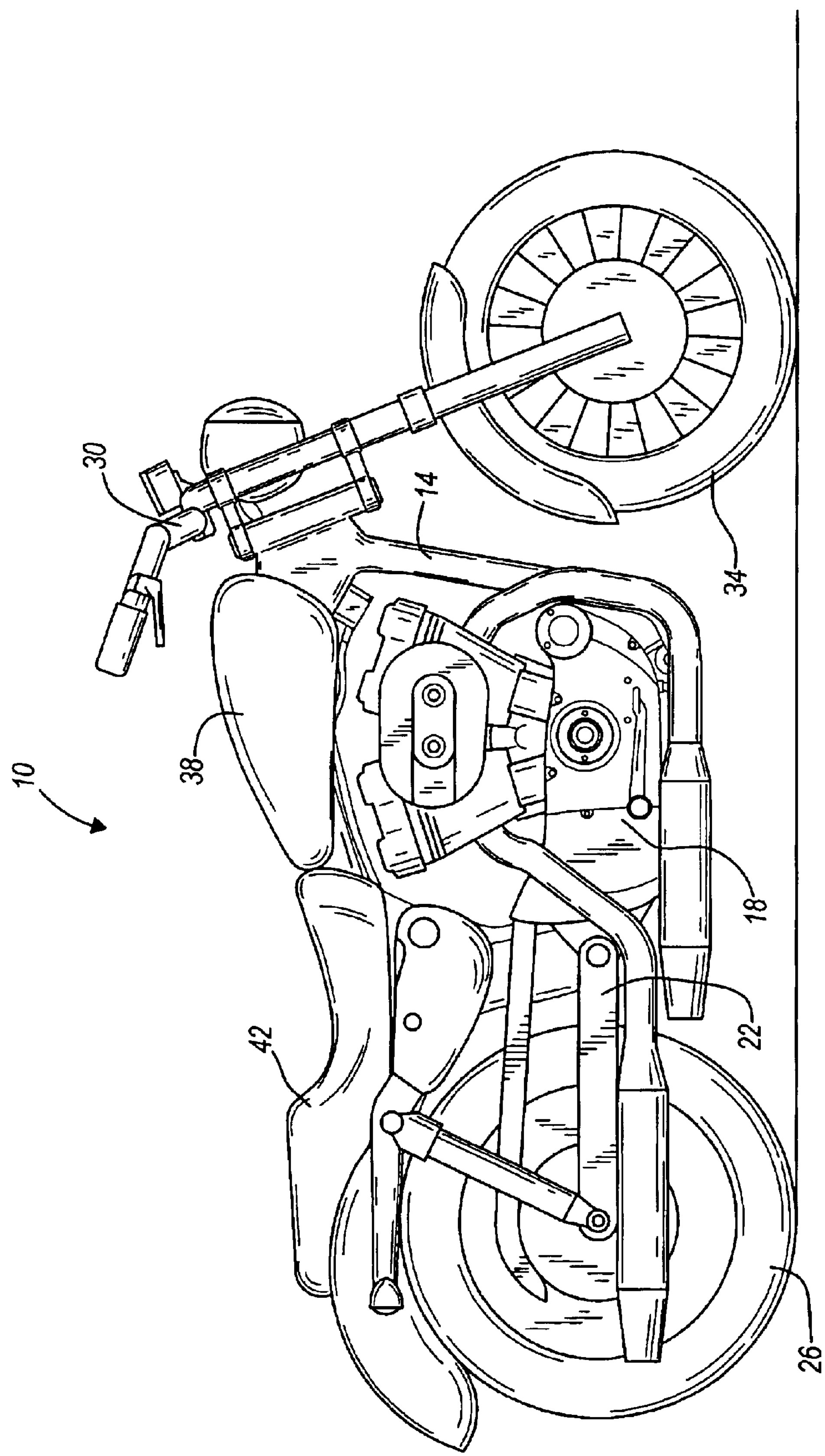
FIG. 1 is a side view of motorcycle embodying some aspects of the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

FIG. 1 illustrates a motorcycle 10 embodying some aspects of the present invention and including a frame 14, an engine 18 supported by the frame 14, a swingarm 22 pivotally coupled to the frame 14 and rotatably supporting a rear wheel 26, and a steering assembly 30 pivotally coupled to a forward portion of the frame 14 and rotatably supporting a front wheel 34. The motorcycle 10 also includes a fuel tank 38 and a seat 42, which are each coupled to the frame 14.

FIGS. 2–6 illustrate the fuel tank 38 in further detail. The fuel tank 38 includes a top wall 46, side walls 50 extending generally downwardly from the top wall 46, bottom walls 54 extending toward one another from the side walls 50, and a tunnel wall 58 extending between the bottom walls 54 and defining a concave tunnel portion 62 of the fuel tank 38. In the illustrated construction, the top wall 46 and the side walls 50 are contoured to generally define an overall shape of the fuel tank 38. It should be appreciated that fuel tank shapes vary significantly between different motorcycles and are often selected to achieve a desired aesthetic appearance. As such, the walls of the fuel tank 38 can each take on substantially any shape or contour to provide an appropriate aesthetic appearance.

The illustrated fuel tank 38 is asymmetrically contoured and has an enlarged forward end 66 and a reduced rearward end 70. The fuel tank 38 includes an inner surface 74 and an outer surface 78. The walls 46, 50, 54, and 58 cooperate to define a fuel chamber 82 having a first side **82*a* and a second side 82*b* (see FIG. 6). The tunnel portion 62 extends between the first and second sides 82*a*, 82*b***.

Figure 3:
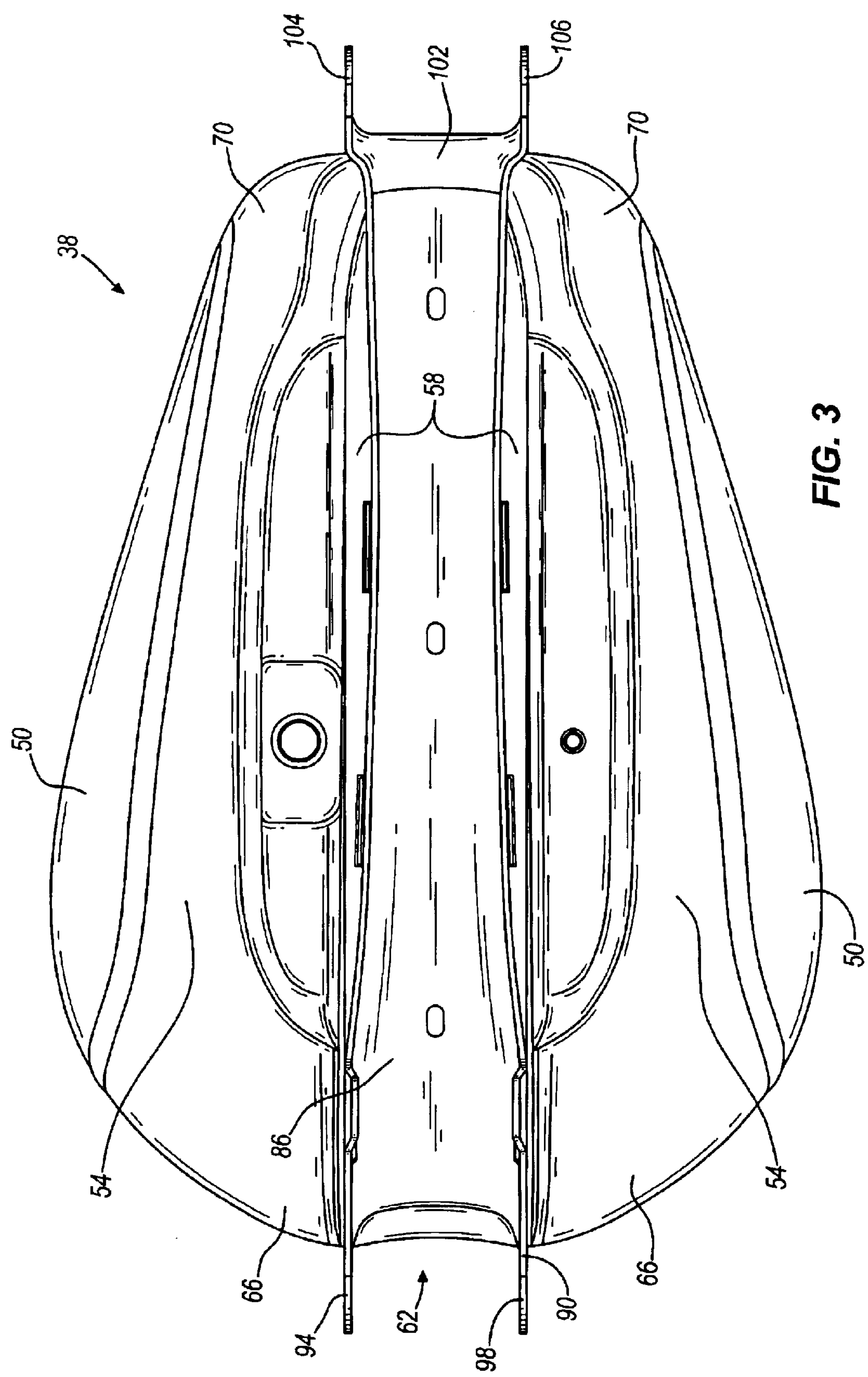
FIG. 3 is a bottom view of the fuel tank assembly illustrated in FIG. 2.
Figure 4:
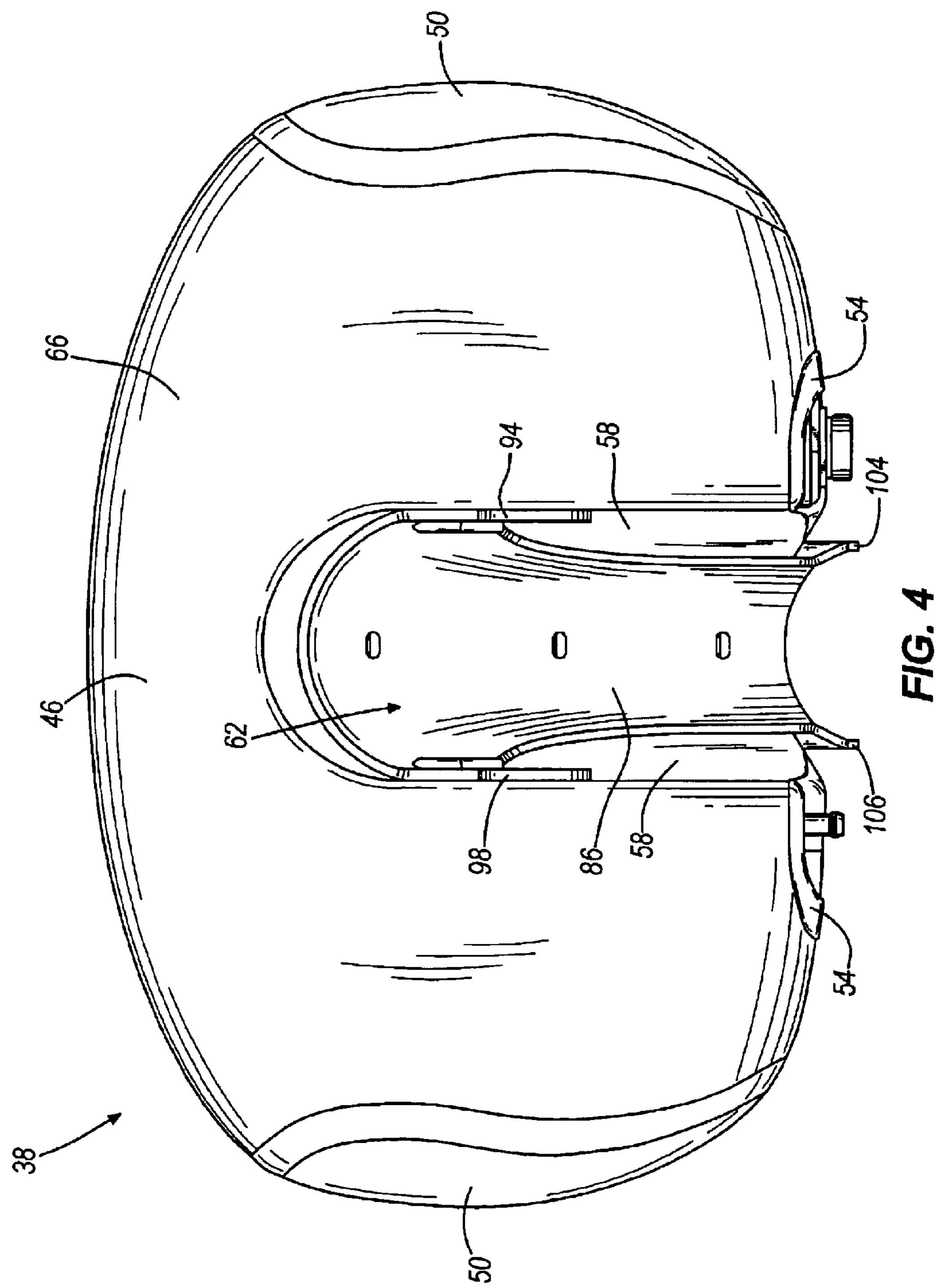
FIG. 4 is a front view of the fuel tank assembly illustrated in FIG. 2.
Figure 5:
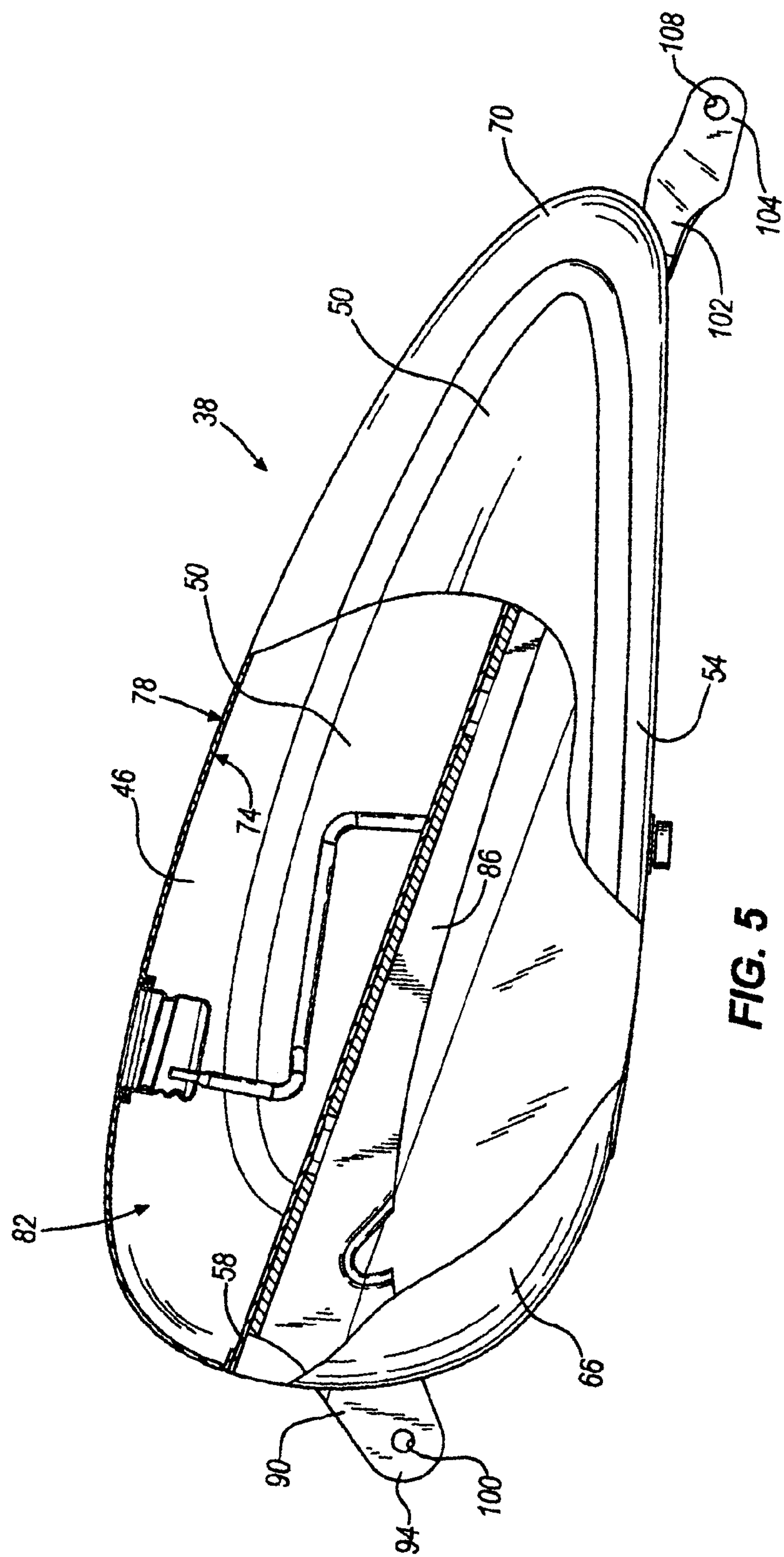
FIG. 5 is a side view of the fuel tank assembly illustrated in FIG. 2 with portions cut away.
Figure 6:
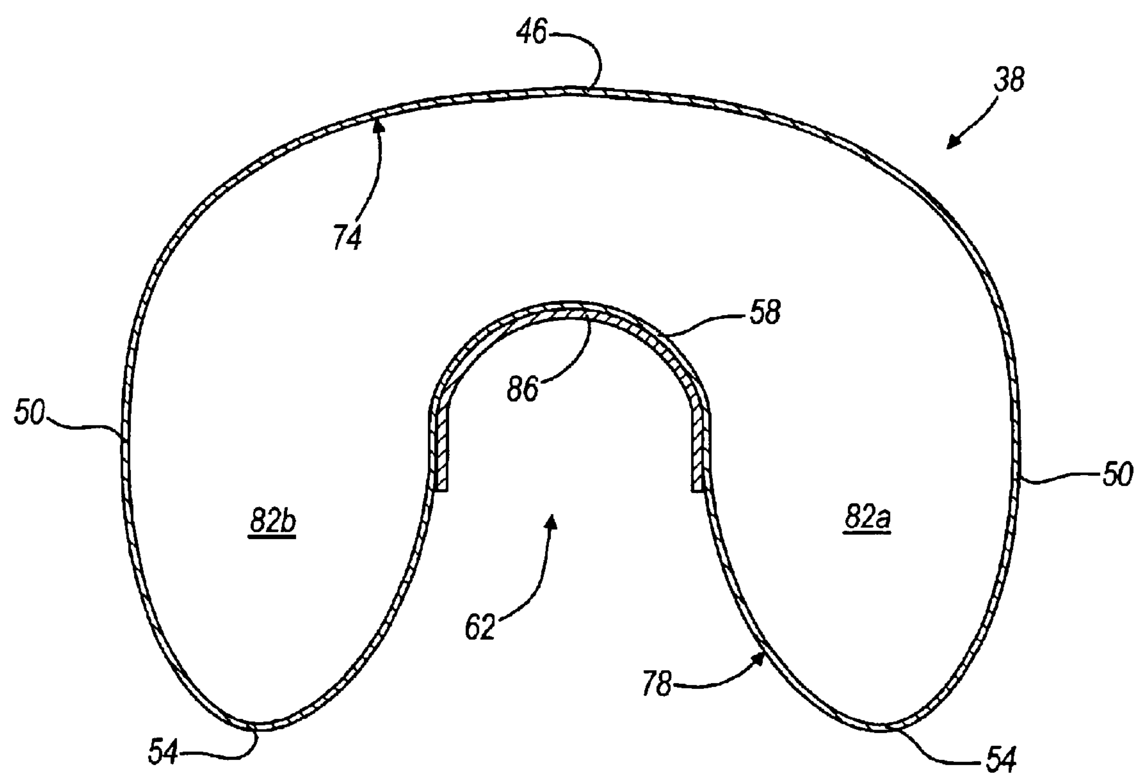
FIG. 6 is a section view taken along line 6—6 of FIG. 2.

As best shown in FIGS. 3 and 4, a one-piece mounting bracket 86 is welded to and extends along the tunnel wall 58. The mounting bracket 86 includes a forward mounting portion 90 that extends forwardly of the enlarged forward end 66 of the fuel tank 38. The forward mounting portion 90 includes a first forward tab 94 that extends forwardly of the first side **82*a* of the fuel chamber 82, and a second forward tab 98 that extends forwardly of the second side 82*b* of the fuel chamber 82. Each tab 94, 98 defines a forward mounting aperture 100**.

Figure 2:
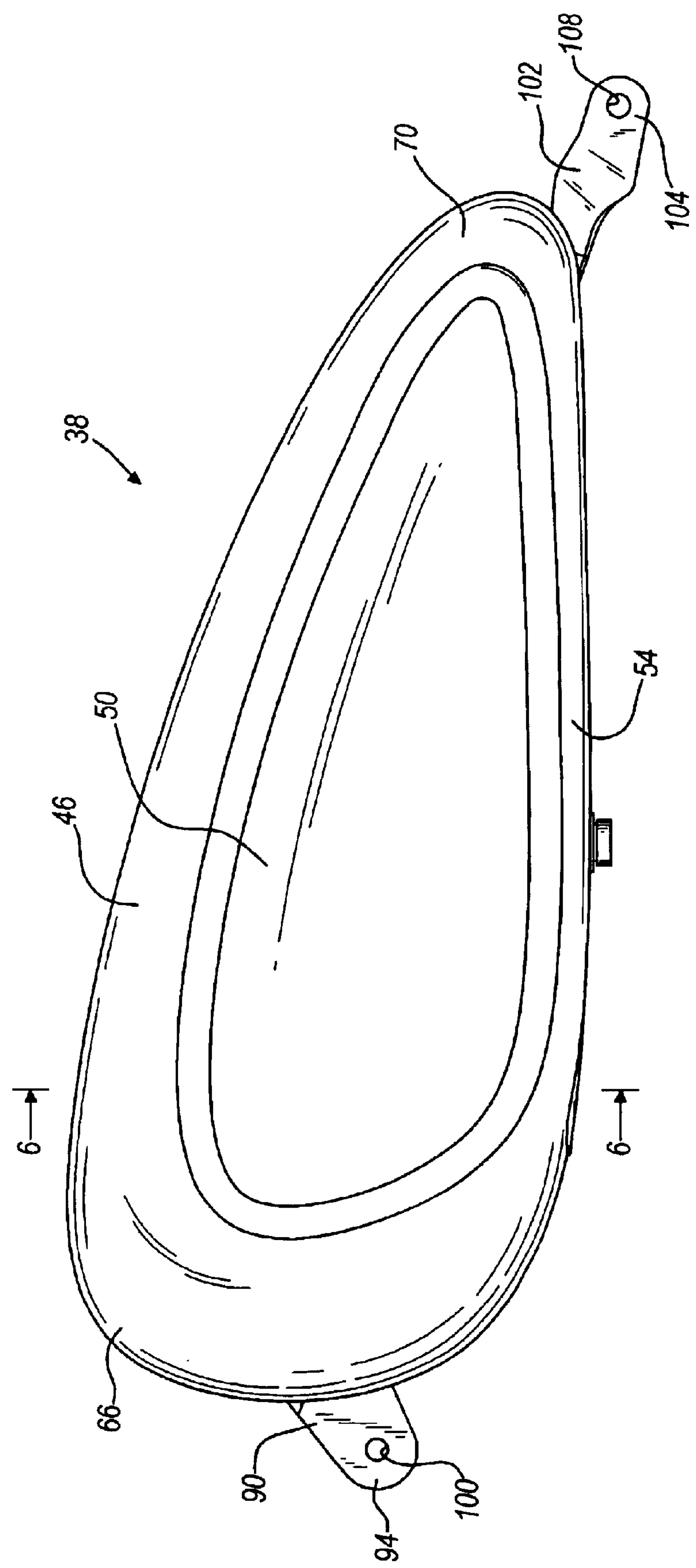
FIG. 2 is a side view of a fuel tank assembly of the motorcycle illustrated in FIG. 1.

With reference to FIGS. 2 and 3, the mounting bracket 86 also includes a rearward mounting portion 102 that extends rearwardly of the reduced rearward end 70 of the fuel tank 38. The rearward mounting portion 102 is generally channel-shaped and defines a first rearward tab 104 and a second rearward tab 106 each defining a rearward mounting aperture 108. As illustrated, portions of the mounting bracket 86 include a semi-circular cross-section that substantially corresponds to the curvature of the tunnel wall 58. The mounting bracket 86 is welded to the forward and rearward ends 66, 70 of the fuel tank 38 adjacent the forward and rearward mounting portions 90, 102. The mounting bracket 86 is also welded to the tunnel wall 58 at positions between the forward and rearward mounting portions 90, 102.

Figure 7:
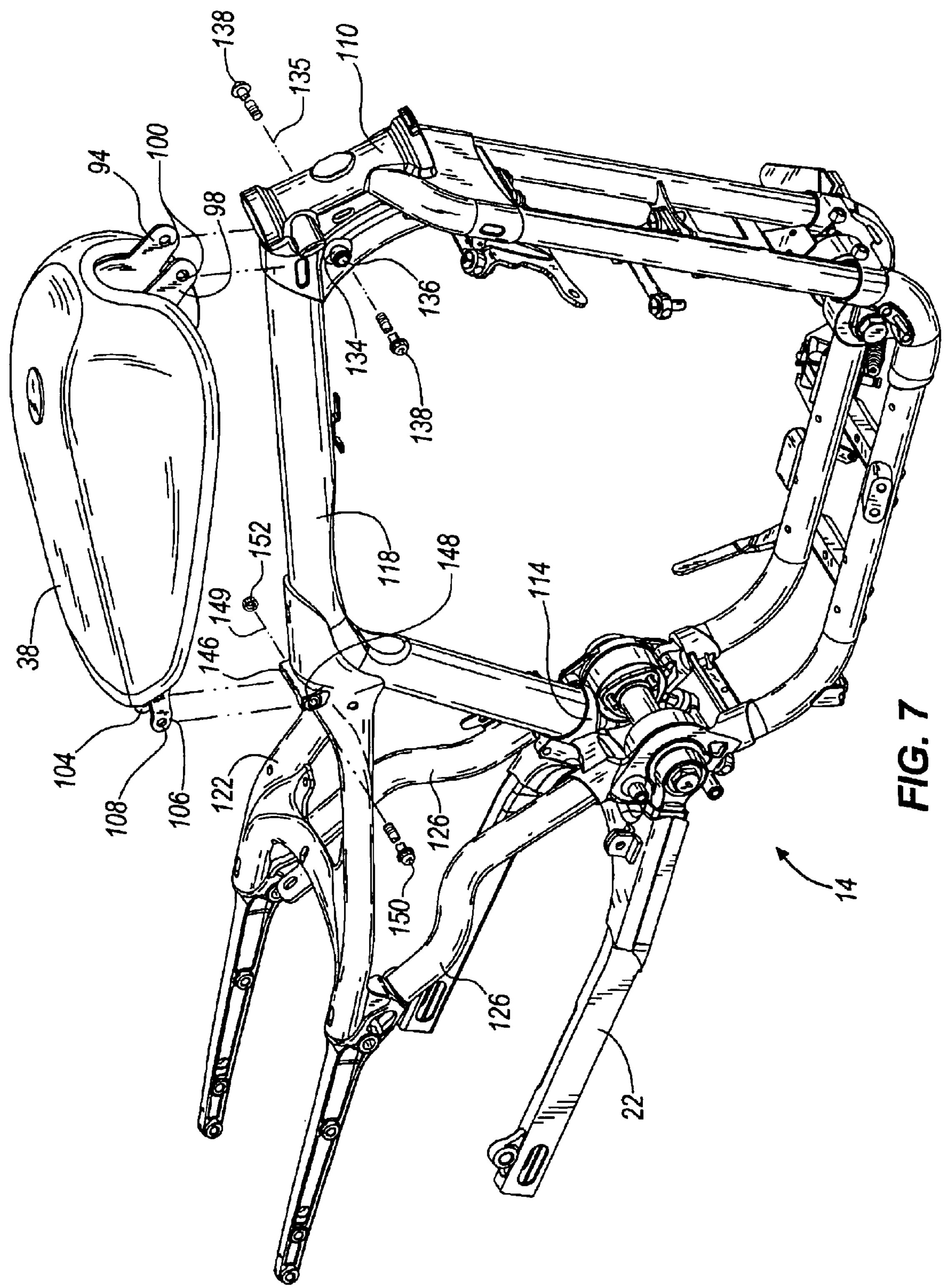
FIG. 7 is an exploded view showing the fuel tank assembly and portions of a frame of the motorcycle of FIG. 1.

With reference to FIG. 7, the frame 14 includes a steering head 110 that pivotally supports the steering assembly 30, and a swingarm pivot area 114 that pivotally supports the swingarm 22. A backbone 118 is welded to and extends between the steering head area 110 and the swingarm pivot area 114. A seat pan 122 is welded to the backbone 118 and extends rearwardly from the backbone 118. Seat pan support members 126 extend upwardly from the swingarm pivot area 114 and further support the seat pan 118.

The steering head 110 provides a pair of mounting bosses 134 that extend outwardly on opposite sides of the motorcycle 10 and define a forward mounting axis 135. Each mounting boss 134 defines a bore 136. When mounting the fuel tank 38 to the frame 14, the first and second forward tabs 94, 98 are aligned with a respective mounting boss 134 on each side of the motorcycle. A pair of forward fasteners 138 are extended through a respective forward mounting aperture 100 and into the respective bore 136 to couple the forward mounting portion 90 of the mounting bracket 86 to the steering head 110. In alternate constructions, a single fastener can be extended through both forward tabs 94, 98 and the mounting bosses 134. A nut, pin, or similar retaining member can then be used to positively retain the single fastener in place. In still other constructions, the mounting bosses 134 can be defined by the backbone 118 such that the forward mounting portion 90 can be coupled to the backbone 118 by one or more fasteners in a manner similar to that described above. A single mounting boss 134 could also be provided on either the steering head 110 or the backbone 118.

The seat pan 122 defines a mounting boss 146 having a mounting bore 148 and defining a rearward mounting axis 149. In the illustrated construction, the rearward mounting axis 149 is substantially parallel to the forward mounting axis 135. However it should be appreciated that the mounting axes 149, 135 could instead be perpendicular or angled with respect to one another in substantially any manner depending upon the configuration of the mounting bracket 86 and/or the frame 14. The mounting boss 146 is spaced from the mounting bosses 134 such that the rearward mounting apertures 108 are aligned with the rear mounting bore 148 when the forward mounting portion 90 is coupled to the steering head 110 as discussed above. A rear fastener 150 is extended through the rear mounting apertures 108 and through the mounting bore 148 to couple the rearward mounting portion 102 to the seat pan 122. A nut 152 secures the rear fastener 150 within the mounting bore 148. When the mounting bracket 86 is coupled to the frame 14, the backbone 118 extends through the tunnel portion 62 of the fuel tank 38. In alternate constructions, the rearward mounting portion 102 can be coupled to a mounting feature or features provided on the backbone 118. Also, two or more mounting fasteners can be used in a manner similar to that discussed above with respect to the forward mounting portion 90.

Because the mounting bracket 86 is individually fabricated as a single piece, the dimensional variation between the forward mounting apertures 100 and the rearward mounting apertures 108 can be reduced relative to a fuel tank 38 having a plurality of mounting brackets that are individually welded or otherwise coupled to the fuel tank 38. The configuration of the one-piece mounting bracket 86 may also provide a more robust coupling between the fuel tank 38 and the frame 14 relative to prior fuel tank mounting arrangements.

The fuel tank 38 and mounting bracket 86 arrangement discussed above allows one style of mounting bracket 86 to be utilized in combination with many different styles of fuel tanks 10. As mentioned above, differently contoured fuel tanks are often utilized to change the aesthetic appearance of the motorcycle 10, and may also be used to change the fuel capacity of the motorcycle 10. For example, a specific model of motorcycle can be provided from the manufacturer with the fuel tank 38, which is coupled to the motorcycle by the mounting bracket 86. The manufacturer may then also provide a second fuel tank having a different outer contour than the first fuel tank 10 as an accessory for the motorcycle. The second fuel tank may be desirable to certain customers who have purchased a motorcycle having the first fuel tank, but who wish to change the aesthetic appearance or fuel capacity of their motorcycle. The second fuel tank, despite having a different outer contour, can be manufactured using a substantially identical mounting bracket 86, which can then be coupled directly to the customer's motorcycle. The application of the mounting bracket 86 therefore reduces the number of parts required for a manufacturer to provide customers with a variety of differently contoured fuel tanks for the same type of motorcycle.

Various features of the invention are set forth in the following claims.

What is claimed is:

1. A motorcycle comprising:

a frame including a forward portion, a rearward portion positioned rearwardly of the forward portion, and a backbone portion between the forward and rearward portions;

a fuel tank including a top wall, side walls extending generally downwardly from the top wall, bottom walls extending from the side walls generally toward one another, and a tunnel wall extending between the bottom walls and defining a concave tunnel portion of the fuel tank, the backbone portion of the frame being positioned in the tunnel portion; and a mounting bracket coupled to and extending along the tunnel wall, the mounting bracket including a forward mounting portion coupled to the forward portion of the frame, and a rearward mounting portion coupled to the rearward portion of the frame to secure the fuel tank to the motorcycle.

2. The motorcycle of claim 1, wherein the forward mounting portion extends forwardly of the fuel tank.

3. The motorcycle of claim 2, wherein the forward mounting portion includes a pair of forwardly extending tabs coupled to and positioned on opposing sides of the forward portion of the frame.

4. The motorcycle of claim 3, wherein the forward portion of the frame includes a steering head.

5. The motorcycle of claim 1, wherein the rearward mounting portion extends rearwardly of the fuel tank.

6. The motorcycle of claim 5, wherein the rearward portion of the frame includes a seat pan portion.

7. The motorcycle of claim 1, wherein the mounting bracket is welded to the tunnel wall.

8. A motorcycle fuel tank assembly comprising:

a fuel tank having forward and rearward ends, an inner surface defining a fuel chamber, and an outer surface, the fuel chamber having a first side and a second side, the first and second sides being separated by a tank tunnel portion; and a mounting bracket coupled to the outer surface and extending along the tunnel portion, the mounting bracket including a forward mounting portion near the forward end of the fuel tank, and a rearward mounting portion near the rearward end of the fuel tank.

9. The motorcycle fuel tank assembly of claim 8, wherein the mounting bracket is welded to the outer surface.

10. The motorcycle fuel tank assembly of claim 8, wherein the outer surface of the tunnel portion is generally concave, and wherein the tunnel portion receives a backbone portion of a motorcycle frame when the fuel tank assembly is mounted on a motorcycle.

11. The motorcycle fuel tank assembly of claim 8, wherein the mounting bracket includes a semi-circular cross-section that substantially corresponds to a curvature of the tunnel portion.

12. The motorcycle fuel tank assembly of claim 8, wherein the forward mounting portion includes a first tab extending forwardly of the first side of the fuel chamber, and a second tab extending forwardly of the second side of the fuel chamber.

13. The motorcycle fuel tank assembly of claim 8, wherein the tunnel portion is defined in a generally downwardly-facing portion of the fuel tank.

14. The motorcycle fuel tank assembly of claim 8, wherein the rearward mounting portion extends rearwardly of the fuel tank.

* * * * *